United States Patent
Bhatia et al.

(10) Patent No.: US 12,164,491 B2
(45) Date of Patent: Dec. 10, 2024

(54) PARAMETER-BASED VERSIONING FOR LOG-BASED BLOCK DEVICES

(71) Applicant: Google LLC, Mountain View, CA (US)

(72) Inventors: Sandeep Bhatia, Bothell, WA (US); Justyna Ilczuk, Dublin (IE); Andrey Arkharov, Kirkland, WA (US); Anik Sarker, Dublin (IE); Sergey Korostelev, Redmond, WA (US); Andrew Kadatch, Redmond, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/077,718

(22) Filed: Dec. 8, 2022

(65) Prior Publication Data

US 2024/0193141 A1 Jun. 13, 2024

(51) Int. Cl.
| | |
|---|---|
| *G06F 7/00* | (2006.01) |
| *G06F 16/21* | (2019.01) |
| *G06F 16/23* | (2019.01) |
| *G06F 16/2457* | (2019.01) |

(52) U.S. Cl.
CPC ........ *G06F 16/219* (2019.01); *G06F 16/2358* (2019.01); *G06F 16/24573* (2019.01)

(58) Field of Classification Search
CPC ............... G06F 16/219; G06F 16/2358; G06F 16/24573
See application file for complete search history.

(56) References Cited

U.S. PATENT DOCUMENTS

| | | | | |
|---|---|---|---|---|
| 6,594,744 | B1* | 7/2003 | Humlicek | G06F 3/0601 714/766 |
| 6,678,809 | B1* | 1/2004 | Delaney | G06F 3/067 707/999.204 |
| 6,981,114 | B1* | 12/2005 | Wu | G06F 11/1469 714/E11.122 |
| 7,174,352 | B2* | 2/2007 | Kleiman | G06F 11/1435 707/999.203 |
| 7,389,393 | B1* | 6/2008 | Karr | G06F 3/067 711/156 |
| 8,131,725 | B2 | 3/2012 | Prahlad et al. | |
| 8,161,254 | B2* | 4/2012 | Liu | G06F 11/1451 711/E12.103 |

(Continued)

FOREIGN PATENT DOCUMENTS

EP 4016320 A1 6/2022

OTHER PUBLICATIONS

LVM Snapshots retrieved Sep. 12, 2022, <https://documentation.suse.com/sles/12-SP4/html/SLES-all/cha-lvm-snapshots.html>.

(Continued)

*Primary Examiner* — Mohammed R Uddin
(74) *Attorney, Agent, or Firm* — Lerner David LLP

(57) ABSTRACT

Data log-base logical block devices are used to control parameter-based versioning at a block-device level. Memory in the block device stores data log indicating data and corresponding metadata, the metadata indicating a particular historical time. The block device may receive a request, such as a remote procedure call (RPC), for data from the logical block device, and identify data included in the data log having metadata that matches or satisfies a historical time parameter included in and extracted from the request.

20 Claims, 4 Drawing Sheets

(56) References Cited

U.S. PATENT DOCUMENTS

| | | | |
|---|---|---|---|
| 8,392,479 B1* | 3/2013 | Pantin | G06F 16/182 |
| | | | 707/823 |
| 8,468,174 B1* | 6/2013 | Yueh | G06F 16/168 |
| | | | 707/821 |
| 9,927,980 B1* | 3/2018 | LeCrone | G06F 11/1456 |
| 10,019,180 B1* | 7/2018 | Miah | G06F 3/065 |
| 10,423,493 B1* | 9/2019 | Vig | G06F 11/3055 |
| 10,474,542 B2 | 11/2019 | Mitkar et al. | |
| 11,126,505 B1* | 9/2021 | Vig | G06F 11/1464 |
| 11,467,913 B1* | 10/2022 | Karr | G06F 3/065 |
| 11,879,887 B2* | 1/2024 | Bhavaraju | G01N 33/48792 |
| 2005/0065962 A1* | 3/2005 | Rowan | G06F 11/1469 |
| | | | 707/999.102 |
| 2005/0066225 A1* | 3/2005 | Rowan | G06F 11/1435 |
| | | | 714/5.11 |
| 2005/0223267 A1* | 10/2005 | Fujibayashi | G06F 11/2082 |
| | | | 714/E11.102 |
| 2006/0047925 A1* | 3/2006 | Perry | G06F 11/1474 |
| | | | 714/E11.131 |
| 2009/0249001 A1* | 10/2009 | Narayanan | G06F 3/0634 |
| | | | 713/324 |
| 2009/0313503 A1* | 12/2009 | Atluri | G06F 11/1464 |
| | | | 714/E11.023 |
| 2011/0093436 A1* | 4/2011 | Zha | G06F 16/178 |
| | | | 711/E12.001 |
| 2014/0214773 A1* | 7/2014 | Zuckerman | G06F 16/1865 |
| | | | 707/684 |
| 2015/0178108 A1* | 6/2015 | Tarasuk-Levin | G06F 9/45558 |
| | | | 718/1 |
| 2015/0324388 A1* | 11/2015 | Benke | G06F 16/184 |
| | | | 707/610 |
| 2017/0300552 A1 | 10/2017 | Mandadi et al. | |
| 2017/0344593 A1* | 11/2017 | Mullick | G06F 16/1873 |
| 2021/0034303 A1* | 2/2021 | Alexeev | G06F 11/3409 |
| 2021/0157628 A1 | 5/2021 | Dornemann et al. | |
| 2021/0303511 A1* | 9/2021 | Karr | G06F 16/1824 |
| 2022/0350497 A1* | 11/2022 | Matosevich | G06F 3/0634 |
| 2024/0028255 A1* | 1/2024 | Hasti | G06F 3/067 |
| 2024/0028878 A1* | 1/2024 | Yu | G06N 3/063 |
| 2024/0031442 A1* | 1/2024 | Bentley | H04L 67/1097 |

OTHER PUBLICATIONS

Invitation to Pay Additional Fees for Application No. PCT/US2023/080660 dated Apr. 22, 2024. 16 pages.

Salzberg, B., et al., "Comparison of Access Methods for Time-Evolving Data", ACM Computing Surveys, vol. 31, No. 2, Jun. 1999. pp. 158-222.

* cited by examiner

PARAMETER-BASED VERSIONING FOR LOG-BASED BLOCK DEVICES

BACKGROUND

A database may include data stored in multiple block devices connected via a network. As data contained in the database changes, a record of previous data may be preserved by collecting a snapshot of the database. The snapshot can then be used to recover lost or corrupted data.

However, snapshotting allows for recovery based on only a limited number of available snapshots of the database. Furthermore, in the case of recovery for a single block device, using a snapshot of an entire database may be inefficient as well as time-consuming.

BRIEF SUMMARY

The present disclosure provides a technique for data recovery at a block-level granularity using metadata to indicate when data is logged at each block device. Versioning and recovery requests may specify certain metadata parameters so that an appropriate version of the data is provided.

In one aspect of the present disclosure, a method includes: receiving, at one or more processors, a remote procedure call (RPC) requesting data from a logical data block storage device of a database, the RPC including a parameter specifying a particular historical time; accessing, by the one or more processors, a data log of the logical data block storage device; identifying, by the one or more processors, a subset of data included in the data log that satisfies the parameter of the RPC, wherein the subset of data is representative of a snapshot of one or more logical data blocks of the logical data block storage device at the particular historical time; and transmitting, by the one or more processors, a reply to the RPC based on the subset of data.

In some examples, the parameter may be a timestamp or a timestamp range, and the subset of data may include, for each data item included in the data log prior to the timestamp or within timestamp range, a most recent version said data item having a timestamp prior to the timestamp or within timestamp range.

In some examples, the method may further include: receiving, by the one or more processors, an update request to update data in the database that is stored at the logical data block storage device; updating, by the one or more processors, the data in the database in response to the update request; and assigning, by the one or more processors, a current time of the update request to the parameter of the updated data update.

In some examples, updating the data in the database may include: writing, by the one or more processors, the updated data to an $n^{th}$ logical data block of the logical data block storage device; and appending, by the one or more processors, the $n^{th}$ logical data block to a series of logical blocks containing previously written data of the logical data block storage device.

In some examples, the RPC may be a request to create a clone or replica of data at the particular historical time, and the method may further include executing, by the one or more processors, a copy-on-write mechanism to generate the clone or replica of the data at the particular historical time.

In some examples, the method may further include: determining, by the one or more processors, that the subset of data for at least one logical data block cannot be accessed or is corrupted; identifying, by the one or more processors, the subset of data included in the data log that satisfies a next-most recent of the parameter of the RPC and that is representative of a snapshot of the one or more logical data blocks of the logical data block storage device at a second, earlier particular historical time. Transmitting the reply to the RPC may be based on the subset of data that satisfies the next-most recent of the parameter of the RPC.

Another aspect of the disclosure is directed to a method comprising: receiving, by one or more processors, a request to configure a workload to run on historical data from a specified historical time, wherein the workload is distributed across a plurality of logical data storage block devices, each block device including a respective data log; transmitting, by the one or more processors, an RPC to one or more servers managing each of the plurality of block devices, wherein the RPC includes a parameter indicating the specified historical time; for each block device of the workload, receiving, by the one or more processors, a reply to the RPC based on a subset of data of the block device satisfying the parameter; and operating, by the one or more processors, subsets of data for the plurality of block devices, wherein the subsets of data for the plurality of block devices are representative of a snapshot of the workload at the specified historical time.

In some examples, the method may further include: receiving, by the one or more processors, an error from at least one block device of the plurality of block devices; and in response to the error, transmitting, by the one or more processors, a request to repair the at least one block device to a state at an earlier historical time preceding the specified historical time.

In some examples, the request to repair the at least one block device may be limited to only the at least one block device from which the error is received.

In some examples, the method may further include transmitting, by the one or more processors, a suspension instruction to suspend activity at the plurality of block devices for a predefined duration of time. Transmitting the RPC and receiving the reply may be performed during the duration of time for which activity of the plurality of block devices is suspended.

In some examples, the method may further include the duration of time may be on the order of milliseconds.

Yet another aspect of the disclosure is directed to a system including: memory storing a data log indicating data stored at a logical data block storage device of a database and one or more corresponding metadata of the stored data, wherein the metadata indicates a particular historical time associated with the data; and one or more processors configured to: receive, from a client device, an RPC requesting data from the logical data block storage device, the RPC including a historical time parameter; identify data included in the data log that satisfies the historical time parameter; and transmit a reply to the RPC based on the identified data.

In some examples, the parameter may be a timestamp or a timestamp range, and the identified data may include, for each data item included in the data log prior to the timestamp or timestamp range, a most-recent version said data item having a timestamp prior to the timestamp or timestamp range.

In some examples, the one or more processors may be configured to: receive an update request to update data in the database that is stored at the logical data block storage device; write the updated data to an $n^{th}$ logical data block of the logical data block storage device; append the $n^{th}$ logical data block to a series of logical blocks containing previously written data of the logical data block storage device; and include a current time of the update request in the metadata of a data log of the updated data.

In some examples, the one or more processors may be configured to: receive a copy request to create a clone or replica of data at the particular historical time; identify data included in the data log having metadata corresponding to the particular historical time; and execute a copy-on-write mechanism to generate the clone or replica of the identified data.

In some examples, the one or more processors may be configured to: receive a second RPC requesting second data from the logical data block storage device, the second RPC including a second historical time parameter; determine that one or more logical blocks containing the second requested data cannot be accessed or is corrupted; and identify earlier data included in the data log for which the metadata indicates a next-most recent particular historical time associated with the earlier data; and transmit the reply to the RPC based on the earlier data.

In some examples, the system may further include a plurality of logical data block storage devices, each respective logical data block storage device including respective memory and one or more respective processors configured to: receive a second RPC to configure a workload to run on historical data from a specified historical time extract from the second RPC a parameter indicating the specified historical time; determine, from a respective data log at the respective memory of the respective logical data block storage device, one or more logical blocks of the respective logical data block storage device containing data satisfying the parameter; and configure the workload according to the determined one or more logical blocks.

In some examples, each respective logical data block storage device may be configured to respond to an error accessing the determined subset of data: in response to an error accessing data from at least one of the one or more logical blocks, determine, from the respective data log at the respective memory of the respective logical data block storage device, one or more second logical blocks of the respective logical data block storage device containing data from a next-previous historical time preceding the specified historical time; and configure the workload according to the determined one or more second logical blocks.

In some examples, each respective logical data block storage device may be configured to: receive a suspension instruction to suspend activity for a predefined duration of time; and receive the second RPC during the predefined duration of time.

In some examples, the predefined duration of time may be on the order of milliseconds.

DETAILED DESCRIPTION

Overview

The present disclosure provides a technique for data recovery at a block-level granularity without using snapshots. The technique uses logs of data stored at each block device of the database, whereby new data is appended to the log instead of overwriting past data. The log data may indicate which data was included in the database at a given time. For example, the logged data may include metadata, such as a timestamp, to indicate when the data was logged, which in turn may indicate when the data was added to the database. A recovery request may then call data having certain metadata parameters, such as data having a particular timestamp or a most recent version of the data having a timestamp that precedes a specified time. The appropriate data may be passed according to the specified parameters during the recovery. This technique would facilitate block device mounts based on data at any given particular time.

The system includes client devices connected to a database through a network connection. Data in the database is stored among multiple logical block devices, each including its own data log. The data stored in the data log may be associated with parameters, including but not limited to a timestamp of the data.

Operations may involve establishing a global time consistency across multiple virtual machines (VMs) by instructing the VMs to suspend activity for a specified amount of time or until a further instruction. An RPC request specifying a particular timestamp is then sent to each VMs, and a set of data from the VMs respective data logs that meets the specified timestamp is provided back to the requesting node in accordance with the request. The resulting collective set of data is indicative of an image of the database at a time of the specified timestamp.

The techniques of the present disclosure may be used to dynamically configure or reconfigure a workload to a given point in time. This could allow for workloads across multiple block devices and across multiple virtual machines to operate on consistent data sets. Even as data in the database changes over time, the workload may continue to operate based on the selected point in time, ensuring reproducibility of experiment results even over a long duration of time, and without requiring source control or snapshotting to store fixed datasets.

Additionally, the techniques of the present disclosure may allow for data recovery at a block-level granularity, such as an auto-repair or fallback mechanism at individual blocks. In such an implementation, if a given block device is identified as faulty, historical block information from the log may be used to revert the block device to an earlier known state based on data from the block device's log, and without having to rely on a snapshot of the database.

Example Systems

Figure 1:
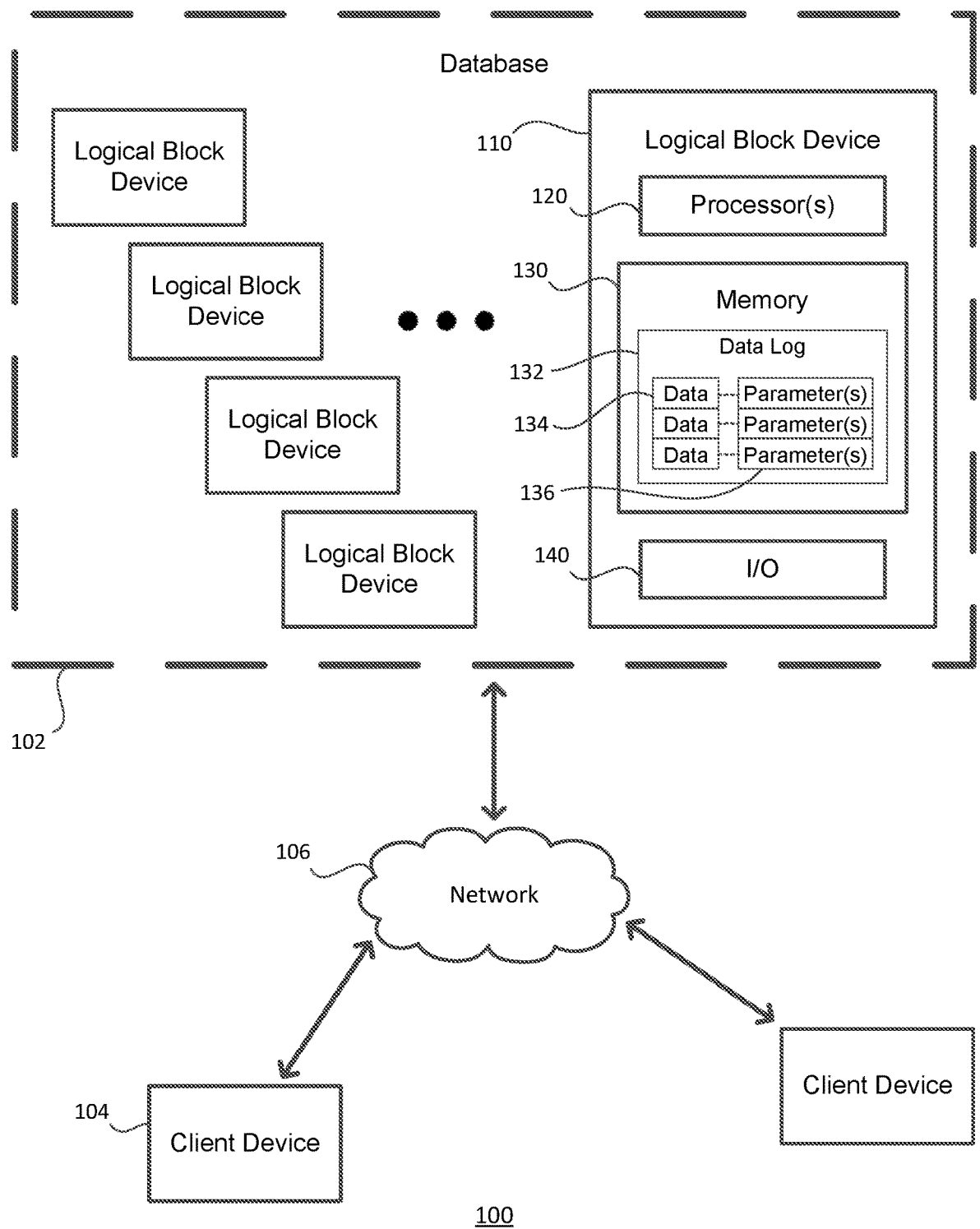
FIG. 1 is a block diagram of an example system in accordance with an aspect of the present disclosure.

FIG. 1. is a block diagram illustrating an example system 100. The system 100 includes a database 102 and a plurality of client devices 104 connected to one another via a network.

The database 102 may be included within a management system for storing and processing data. The database may include multiple storage devices configured to store the data. The storage devices may be divided into logical sectors, herein referred to as logical blocks. Logical blocks may be provided in various sizes, such as for example 512 bytes (512 B), 4 kilobytes (4 KB), or other binary sizes. In the example of FIG. 1, the database is shown to include a plurality of logical block devices 110, each logical block device capable of being divided into blocks for the purpose of logical data storage at the device.

Each client device 104 may be configured with a processor, memory, instructions, and data. For example, each client device may be a personal computer, intended for use by a person having all the internal components normally found in a personal computer such as a central processing unit (CPU), an optional display device (for example, a monitor having a screen, a projector, a touch-screen, a small LCD screen, a television, or another device such as an electrical device that can be operable to display information processed by the processor), CD-ROM, hard drive, user input (for example, a mouse, keyboard, touch screen or microphone), speakers, modem and/or network interface device (telephone, cable or otherwise) and all of the components used for connecting these elements to one another. Moreover, computers in accordance with the systems and methods described herein may comprise devices capable of processing instructions and transmitting data to and from humans and other computers including general purpose computers, PDAs, network computers lacking local storage capability, set top boxes for televisions, and other networked devices. The client devices may include mobile devices capable of wirelessly exchanging data over a network such as the Internet. By way of example only, a client device may be a wireless-enabled PDA, tablet PC, or a cellular phone capable of sending information via the Internet. The user may input information, for example, using a small keyboard, a keypad, or a touch screen.

The network 106 may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

The logical block devices 110 of the database 102 may be implemented as computing systems using a combination of software and hardware, for example including one or more servers and processors 120 coupled with one or more memory or storage devices 130 though a high speed link or other physical or logical connector. The processors 120 may be any logic circuitry that processes instructions, including but not limited to instructions fetched from the memory 130 or cache. In some embodiments, the processors 120 may include microprocessor units or special purpose processors. The processors 120 may include single core or multi-core processors, may be configured to run multi-threaded operations, may host one or more virtual machines or containers, along with a hypervisor or container manager for managing the operation of the virtual machines or containers, and so on.

The memory 130 may be any device suitable for logically addressing and storing computer readable data. Memory 130 may be implemented using flash memory devices, such as for example NAND flash memory devices, or other types of non-volatile memory devices. In certain implementations, volatile memory devices such as random access memory devices, as well as other types of memory, may be used. For example, memory 130 may support virtualized or containerized memory accessible by virtual machine or container execution environments. Additionally, any number of memory devices may be included.

In the example of FIG. 1, the memory 130 is shown to contain a data log 132. The data log may indicate the presence of certain data 134 at the device, as well as metadata associated with the stored data 134. The metadata may include one or more parameters 136 which may be used to classify the various data 134. Example classifications may include data type, data source, a size of the data, and certain times associated with the data, such as a time the data was created, first accessed, most recently edited, most recently accessed, and so on. A time-based classification may rely on timestamps, such as a clock time that may be synchronized among the plurality of logical block devices 110 of the database. Additionally or alternatively, time-based classifications may be established using other classifiers such as a version number or generation number.

Data 134 stored in the block devices may be accessed and edited. In order to maintain historical records of earlier data, instead of overwriting the edited data, a new copy or version of the data may be created and stored in the block device 110. The new version may receive one or more parameters that are different from the parameters of the previous version of the data, such as a different timestamp or a different version or generation number. Storage of the new version of data may be facilitated by appending the new data to the previous data along with the parameters to differentiate the different versions from one another. For instance, the logical block storage may be stored serially, with each previous block of the series containing previously written data. Alternatively, blocks may be copied to another location in response to edits, such as by using a Copy on Write (CoW) function. Such functions may be used to support data cloning or data replication functions within the database.

Communication interfaces 140 in the logical block device 110 may include hardware and software to enable communication of data over wired or wireless connections, using standards such as Wi-Fi, Bluetooth, infrared, radio-wave, and/or other analog and digital communication standards. The communication interfaces allow for the logical block device 110 to be updated and for information generated by the device 110 to be shared to other devices, including the client devices 104. In some examples, communication interfaces can send information stored in memory to another device, such as a client device 104, for display, storage or further analysis.

Example Methods

Figure 2:
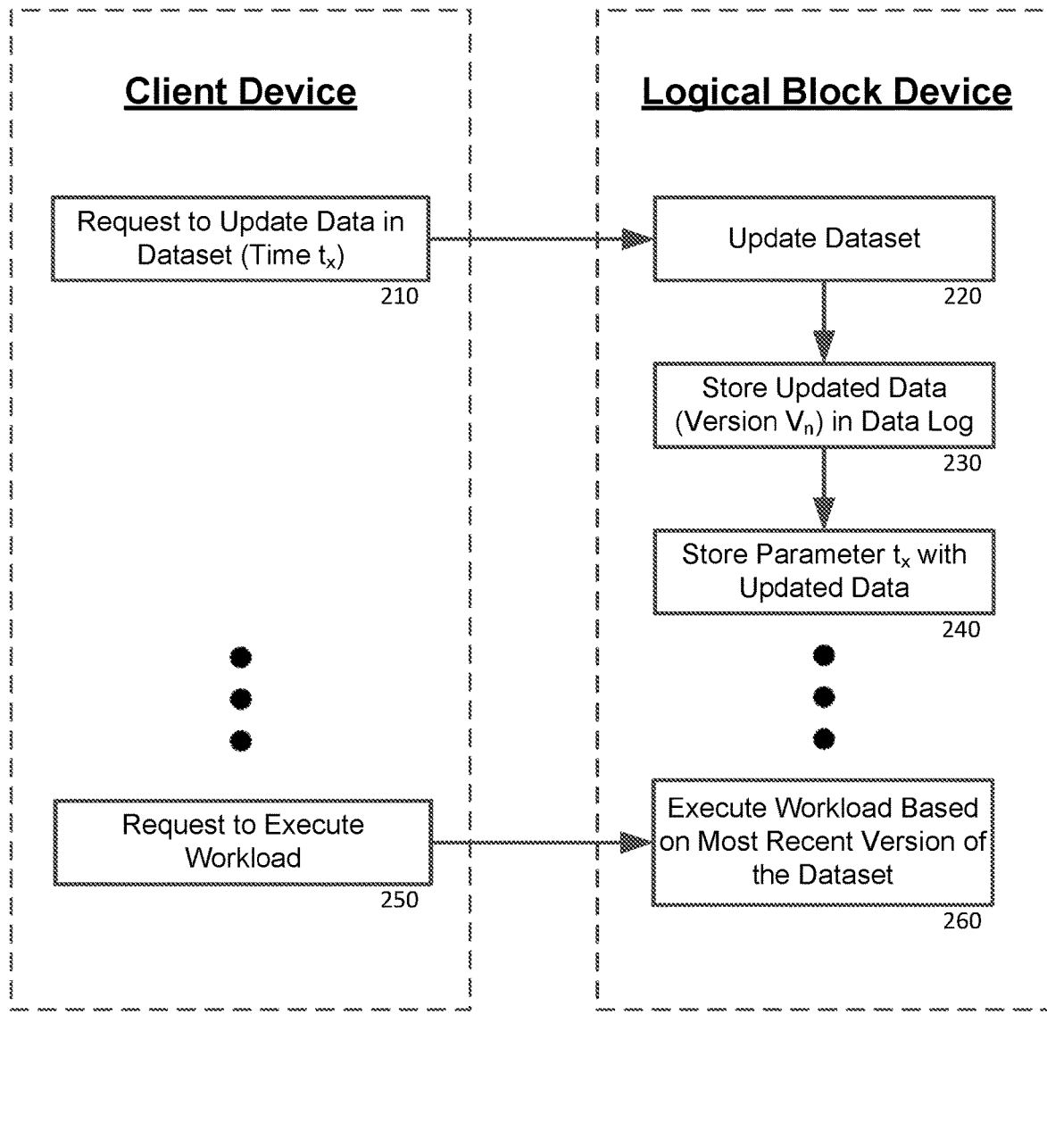
FIG. 2 is a block diagram of an example data flow for parameter-based versioning in accordance with an aspect of the present disclosure.

FIG. 2 is a block diagram illustrating an example data flow between a client device and a logical block device of the database, such as the devices 104, 110 shown in the example system 100 of FIG. 1. In the example of FIG. 1, a routine 200 for parameter-based versioning is shown. At block 210, the client device transmits a request to the database to update data within a given dataset. The request is made at a specified time $t_x$. The dataset is stored in a logical block device of the database, and the request is forwarded to the logical block device. At block 220, the logical block device receives the request and updates the dataset as instructed. Next, at block 230, an updated version of the dataset is stored in the data log of the logical block device. The updated version is referred to herein as $V_n$. Since the updated version of the dataset is created based on an instruction issued at time $t_x$, the data is stored with a corresponding parameter to indicate the time $t_x$. Such a parameter may be either a clock time, version or generation number, or other parameter used to track versioning.

At a later time, at block 250, the client device transmits a request to execute a workload based on the dataset stored in the database. Since the dataset is stored at the logical block device shown, the client device request is forwarded to the logical block device, where at block 260, the device executes the workload. In the present example, it is assumed that the request is a request to execute the workload on the most up-to-date version of the dataset, although in other examples herein older versions of a dataset may be requested. Since multiple versions of the dataset are stored at the logical block device, the device may determine a most recent version of the dataset based on the data and corresponding parameters stored at the data log.

In some cases, there may be a fault or error at one or more logical block devices, for instance due to data corruption. In such a case, the client device's request to execute a workload may successfully access some portions of the dataset needed for the workload, while other portions of the dataset may not be accessed. Instead, it may be necessary to access an earlier version of the dataset. Conventionally, accessing an earlier version would involve retrieving an image of the database saved at an earlier time, and then accessing the dataset from the image. However, using the auto-recovery routine 300 of FIG. 3, the need for accessing an image at the database level of graduality can be avoided.

Figure 3:
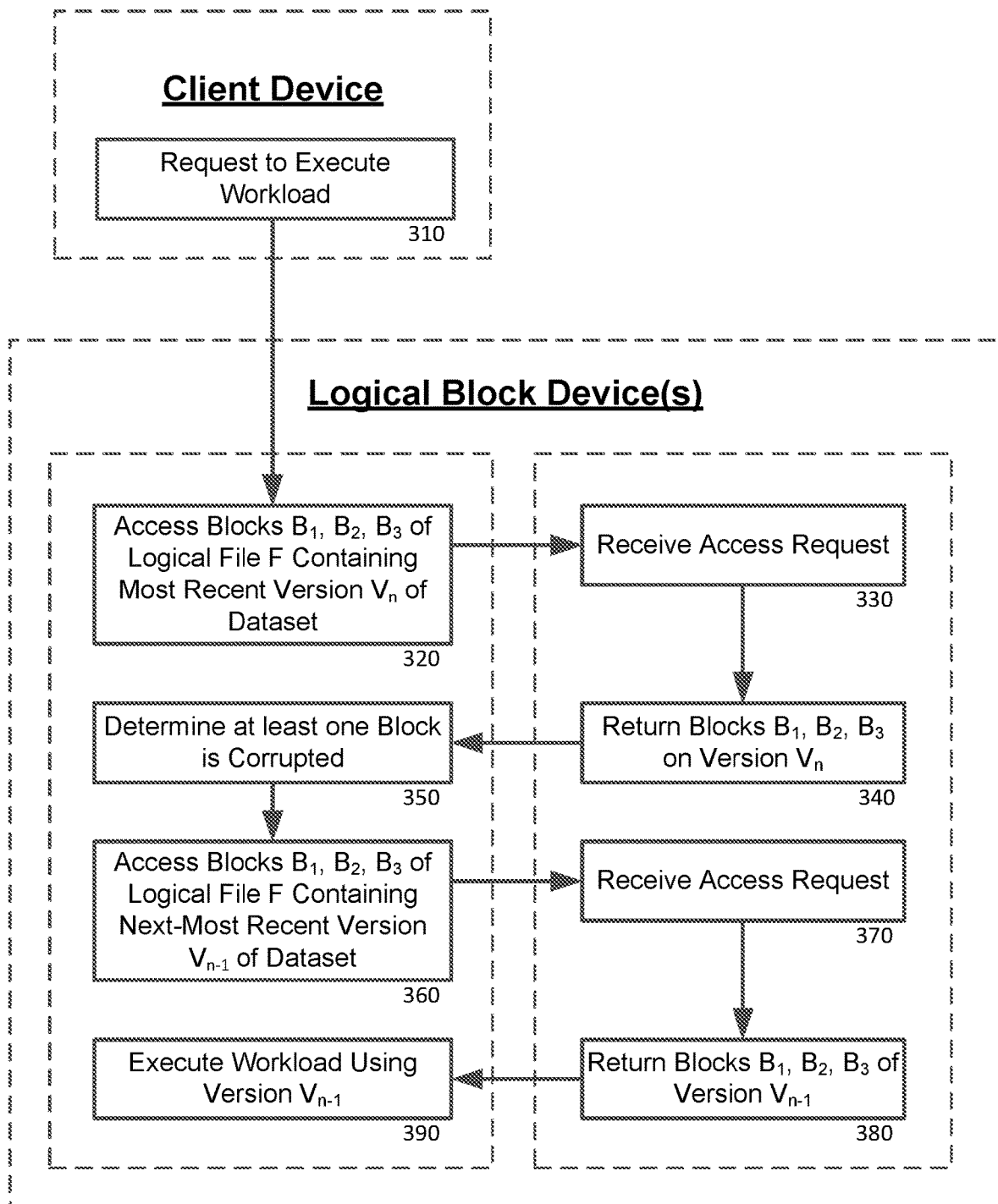
FIG. 3 is a block diagram of an example data flow for data auto-recovery in accordance with an aspect of the present disclosure

In the routine 300 of FIG. 3, operations begin at block 310, with the client device requesting to execute the workload. The request may be transmitted to one or more logical block devices of the database. At block 320, one or more processors 325 of the logical block device determine which logical blocks of the device contain the dataset needed to execute the workload. In the example of FIG. 3, these blocks are denoted as $B_1$, $B_2$ and $B_3$, and the requested data is organized within a logical file divided and addressed among the logical blocks $B_1$, $B_2$ and $B_3$. Also, in the example of FIG. 3, it is assumed that the request to execute the workload is a request to use the most up-to-date available version of the dataset to execute the workload, which in the case of a dataset for which there are N available version, the most up-to-date version is denoted as $V_n$.

At block 330, memory 335 of the logical block device receives the request from the one or more processors 325 for blocks $B_1$, $B_2$ and $B_3$ of version $V_n$, and at block 340, returns the requested blocks. However, at block 350, it is determined that at least one block in which the dataset is stored is corrected and that the data stored therein cannot be accessed. In response, the one or more processors 325 issue a second request to access logical blocks $B_1$, $B_2$ and $B_3$ of the logical F that contain a previous version of the dataset, herein denoted as $V_{n-1}$. At block 370, the access request is received and at block 380 the requested blocks of version are returned $V_{n-1}$. Subsequently, at block 390 the workload is executed at the logical block device, or the accessed data is transmitted to another host for execution of the workload. Since version n−1 is the most up-to-date accessible version of the database, it is the version that is used to execute the workload.

Notably, the auto-recovery features of the routine of FIG. 3 may be utilized at a block-level granularity of the system, meaning that significant time and resources are conserved by accessing only those blocks where relevant data is stored.

In addition to auto-recovery, the data log-based data retrieval can be used to request historical data. Requesting historical data may be advantageous for ensuring the reproducibility of results. In other words, if a workload is run on a specific data set at one time $t_x$ and then run again at a later time $t_{x+1}$, the resulting data may different even if the workload remains the same. This is because changes in the data set between those two times may cause the same operations to produce different results. However, being able to request the data that was available at time $t_x$, even at the current time $t_c$, ensures that the same operations produce the same results. While other solutions for ensuring reproducibility exist, such as source control or traditional snapshotting, those solutions are relatively costly in terms of processing. By contrast, the data log-based routines of the present disclosure can be achieved by organizing the data log in a manner that makes block-level calls to historical data simple and straightforward.

Figure 4:
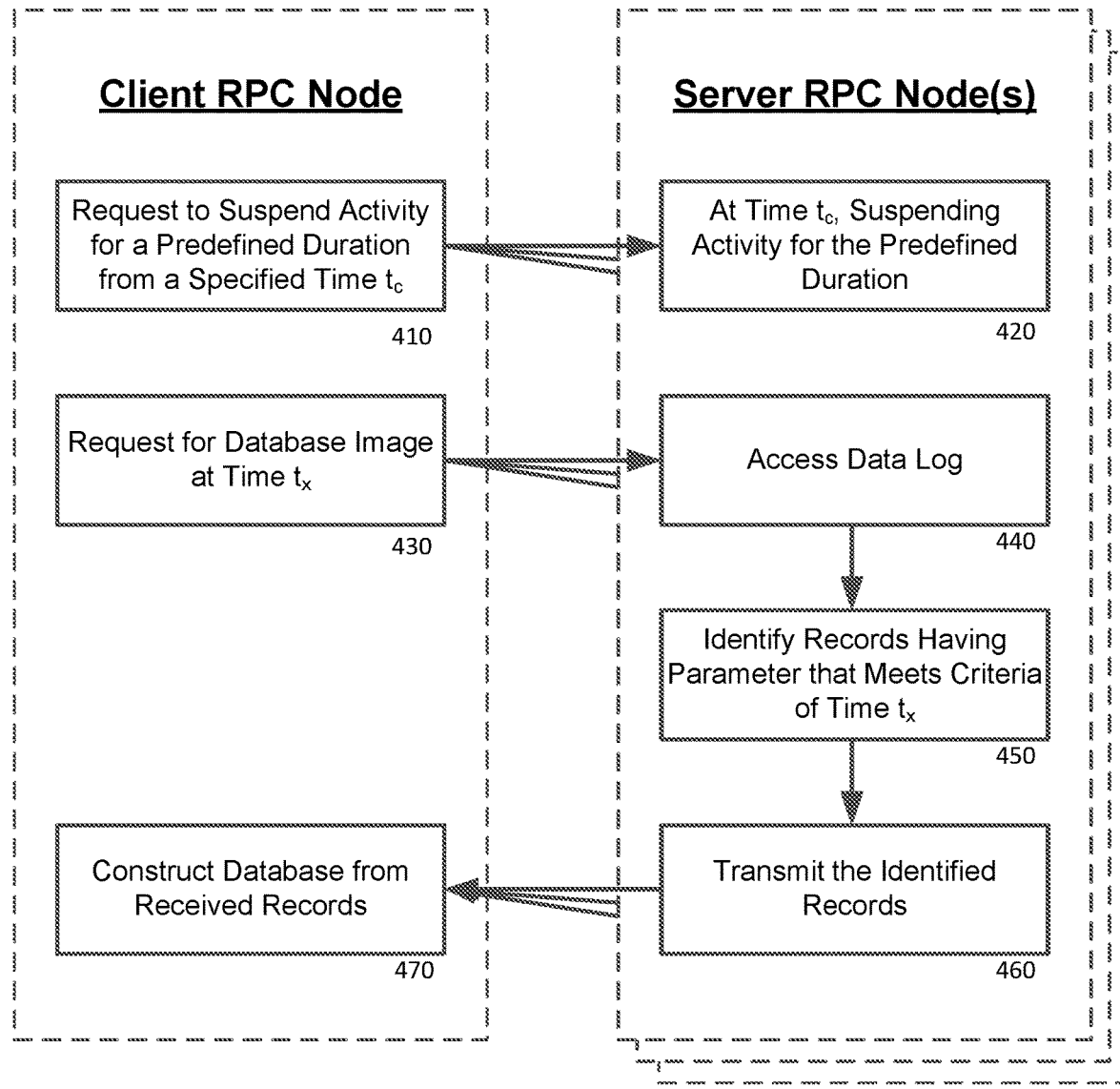
FIG. 4 is a flow diagram of an example request-based configuration routine according to an aspect of the present disclosure.

In the example routines of FIGS. 2 and 3, only a single block storage device of the database is shown. However, in other examples, it may be necessary to retrieve data from multiple block storage devices included in the database. In such a case, it may be necessary to ensure synchronicity across the devices of the database to ensure data consistency in response to the request, and in turn to ensure proper operation of the workload. FIG. 4 illustrates a request-based configuration routine for configuring a workload to operate on historical records stored over multiple logical block devices of the database.

In particular, in the example of FIG. 4, the client device and logical block devices communicate using a remote procedure call (RPC) protocol, in which the client device is identified as a client RPC node, and the logical block devices are server RPC nodes. The RPC may be utilized by the client device to copy parameters into a message containing the request, whereby the parameters can be read by the remote server node in the database, and the appropriate regular procedure call may be executed in response. In the examples of the present disclosure, the "timestamp" or "version" or "generation" parameters described herein may be used as a first class parameter of the RPC so that the block storage devices may respond to the RPC call with a message containing the requested dataset that matches the parameters of the request.

One challenge to the RPC framework in the example of FIG. 4 is to ensure that the parameters are handled consistently across the database. The database may include multiple devices, such as multiple independently operating virtual machines (VMs), whereby each device or VM may respond to the RPC at a slightly different time, which may result in inconsistent results returned to the client device. In order to avoid this inconsistency, the routine 400 of FIG. 4 begins, at block 410, with the client RPC node transmitting to all server RPC nodes a request to suspend activity. The request may specify a particular time, such as the current time $t_c$, at which the suspension commences, as well as a particular duration of time for which, or condition upon which, the suspension lasts. At block 420, the server RPC nodes receive the suspension request and commence suspension for the predefined duration or according to the specified conditions.

At block 430, the client RPC node issues a second request for a specific dataset included in the database at a historical time $t_x$. In one example, the dataset may be the equivalent of an image or snapshot of the database at the time $t_x$. In other examples, the dataset may be a subset of the information included in the database at time $t_x$, and may be included in only some of the logical blocks of the database.

At block 440, the server RPC nodes receive the second request. Each server RPC node accesses its respective data log. At block 450, each server RPC node identifies records in the respective data log that have the parameter matching the criteria specified in the second request, which in this case is a time $t_x$. The time $t_x$ may be interpreted as a specific value that matches a value in the data log records. Alternatively, the parameter may be considered to match a range of values, such as a duration of time beginning or ending at time $t_x$. For further example, if multiple versions of a data record exist at the data log, the data record having a largest value that does not exceed $t_x$, meaning that the version was the most recently created version of the data record in existence at time $t_x$, may be considered to match.

Once the matching records have been identified, at block 450, the server RPC nodes may reply to the second request by transmitting the identified records. The identified records may be used at the client RPC node at block 470 to reconstruct the requested dataset of the database. Alternatively, instead of sending the records to the client RPC node, the server RPC node may execute processing on the identified records, such as executing a workload on the records, and transmit a result of the workload to the client RPC node. It should be noted that suspension of the server RPC nodes does not have to persist through the entire routine 400. Rather, once the server RPC nodes have been globally synchronized using the initial suspension request, it may be possible to access consistent records across the multiple devices and VMs hosted at the server RPC nodes. For instance, the suspension may last for only a short amount of time on the order of milliseconds.

The above example routines generally describe storage, recovery, and mounting operations that can be executed through contextual parameter passing, such as by RPC protocol, at the block device-level without having to snapshot entire databases. These routines can be used to effectively fetch data active at a particular time without having to organize all the data from that particular time in a single storage location. The routines can also be used to clone or replicate data. For example, the RPC may be a request to create a clone or replica of data at the particular historical time. This can be facilitated by a copy-on-write (CoW) mechanism to generate the clone or replica of the data at the particular historical time.

The reconfiguration techniques described herein are also more dynamic than those of traditional snapshotting, restoring and device mounting. Due to the processing and storage costs of taking entire snapshots of large datasets or databases, only a discrete number of snapshots may be preserved within a system at a given time, meaning that fewer versions of historical data are typically kept in storage. By contrast, a parameter-based procedure can access data from a narrower time window since each data record can be pinpointed to a specific time or generation by its metadata.

Additionally, with respect to storage constraints, data preservation techniques may also be more dynamic than those of traditional snapshotting. This is because a decision over whether to preserve or delete historical data can also be made at the block device level. For example, some historical data may be regularly accessed even after several newer versions of the data have been created, while other historical data may never be accessed after a newer version is created. In such cases, the system may be capable of tracking access patterns to data, and selectively deleting data based on the existence of newer versions and the access patterns indicating that the older data is not accessed or is infrequently accessed. Like the recovery and mounting solution of the present disclosure, these preservation decisions can be made on a block-device level, meaning that some data from a given "snapshot" or period of time may be preserved while other data from the same period of time may be deleted.

The techniques of the present disclosure can also be used to allow clients to version their block devices, whereby versioning could be easily mapped to time markers or other time-related parameters on the block device.

While the example storage and auto-recovery techniques described in connection with FIGS. 2 and 3 are shown as being performed for a single block device, it should be recognized that the underlying principles of the present disclosure can be applied to facilitate storage and auto-recovery among multiple block devise and multiple VMs, such as by using the techniques described in connection with FIG. 4. Conversely, while the example configuration technique described in connection with FIG. 4 is shown as being performed for multiple block devices, it should be appreciated that the same principles may be applied to accessing and configuring data from a single block device.

Furthermore, while the example techniques are generally described in connection with executing a workload or constructing a database, it should be recognized that the underlying principles of the present disclosure may be applied to other uses and functions where data log-based logical storage is used so that subsets of data may be accessed, processed or both based on parameters passed during a request for the data.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:
1. A method comprising:
    receiving, at one or more processors, a remote procedure call requesting data from a logical data block storage device of a database, the remote procedure call including a parameter specifying a particular historical time;
    accessing, by the one or more processors, a data log of the logical data block storage device in response to the remote procedure call;
    identifying, by the one or more processors, a subset of data included in the data log that satisfies the parameter of the remote procedure call, wherein the subset of data includes data contained at one or more logical data blocks of the logical data block storage device at the particular historical time at a block-level granularity; and transmitting, by the one or more processors, a reply to the remote procedure call based on the subset of data.

2. The method of claim 1, wherein the parameter is a timestamp or a timestamp range, and wherein the subset of data includes, for each data item included in the data log prior to the timestamp or within timestamp range, a most recent version said data item having a timestamp prior to the timestamp or within timestamp range.

3. The method of claim 1, further comprising:
receiving, by the one or more processors, an update request to update data in the database that is stored at the logical data block storage device;
updating, by the one or more processors, the data in the database in response to the update request; and
assigning, by the one or more processors, a current time of the update request to the parameter of the updated data update.

4. The method of claim 3, wherein updating the data in the database includes:
writing, by the one or more processors, the updated data to an $n^{th}$ logical data block of the logical data block storage device; and
appending, by the one or more processors, the $n^{th}$ logical data block to a series of logical blocks containing previously written data of the logical data block storage device.

5. The method of claim 1, wherein the remote procedure call is a request to create a clone or replica of data at the particular historical time, and wherein the method further comprises executing, by the one or more processors, a copy-on-write mechanism to generate the clone or replica of the data at the particular historical time.

6. The method of claim 1, further comprising:
determining, by the one or more processors, that the subset of data for at least one logical data block cannot be accessed or is corrupted;
identifying, by the one or more processors, the subset of data included in the data log that satisfies a next-most recent of the parameter of the remote procedure call and that is representative of a snapshot of the one or more logical data blocks of the logical data block storage device at a second, earlier particular historical time,
wherein transmitting the reply to the remote procedure call is based on the subset of data that satisfies the next-most recent of the parameter of the remote procedure call.

7. A method comprising:
receiving, by one or more processors, a request to configure a workload to run on historical data from a specified historical time, wherein the workload is distributed across a plurality of logical data storage block devices, each logical data storage block device including a respective data log;
transmitting, by the one or more processors, a remote procedure call to one or more servers managing each of the plurality of logical data storage block devices, wherein the remote procedure call includes a parameter indicating the specified historical time;
for each block device of the workload:
accessing, by the one or more processors, the data log of the logical data block storage device in response to the remote procedure call; and receiving, by the one or more processors, a reply to the remote procedure call based on a subset of data of the logical data storage block device satisfying the parameter; and operating, by the one or more processors, subsets of data for the plurality of logical data storage block devices, wherein the subsets of data for the plurality of logical data storage block devices include data contained at the workload at the specified historical time at a block-level granularity.

8. The method of claim 7, further comprising:
receiving, by the one or more processors, an error from at least one logical data storage block device of the plurality of logical data storage block devices; and
in response to the error, transmitting, by the one or more processors, a request to repair the at least one logical data storage block device to a state at an earlier historical time preceding the specified historical time.

9. The method of claim 8, wherein the request to repair the at least one logical data storage block device is limited to only the at least one logical data storage block device from which the error is received.

10. The method of claim 7, further comprising:
transmitting, by the one or more processors, a pause instruction to pause activity at the plurality of logical data storage block devices for a predefined duration of time, wherein transmitting the remote procedure call and receiving the reply are performed during the duration of time for which activity of the plurality of logical data storage block devices is paused.

11. The method of claim 10, wherein the duration of time is on the order of milliseconds.

12. A system comprising:
memory storing a data log indicating data stored at a logical data block storage device of a database and one or more corresponding metadata of the stored data, wherein the metadata indicates a particular historical time associated with the data; and
one or more processors configured to:
receive, from a client device, a remote procedure call requesting data from the logical data block storage device, the remote procedure call including a historical time parameter;
access the data log of the logical data block storage device in response to the remote procedure call;
identify data included in the data log that satisfies the historical time parameter at a block-level granularity; and
transmit a reply to the remote procedure call based on the identified data.

13. The system of claim 12, wherein the parameter is a timestamp or a timestamp range, and wherein the identified data includes, for each data item included in the data log prior to the timestamp or timestamp range, a most-recent version said data item having a timestamp prior to the timestamp or timestamp range.

14. The system of claim 12, wherein the one or more processors are configured to:
receive an update request to update data in the database that is stored at the logical data block storage device;
write the updated data to an $n^{th}$ logical data block of the logical data block storage device;
append the $n^{th}$ logical data block to a series of logical blocks containing previously written data of the logical data block storage device; and
include a current time of the update request in the metadata of a data log of the updated data.

15. The system of claim 12, wherein the one or more processors are configured to:
- receive a copy request to create a clone or replica of data at the particular historical time;
- identify data included in the data log having metadata corresponding to the particular historical time; and
- execute a copy-on-write mechanism to generate the clone or replica of the identified data.

16. The system of claim 12, wherein the one or more processors are configured to:
- receive a second remote procedure call requesting second data from the logical data block storage device, the second remote procedure call including a second historical time parameter;
- determine that one or more logical blocks containing the second requested data cannot be accessed or is corrupted;
- identify earlier data included in the data log for which the metadata indicates a next-most recent particular historical time associated with the earlier data; and
- transmit the reply to the remote procedure call based on the earlier data.

17. The system of claim 12, further comprising a plurality of logical data block storage devices, each respective logical data block storage device including respective memory and one or more respective processors configured to:
- receive a second remote procedure call to configure a workload to run on historical data from a specified historical time
- extract from the second remote procedure call a parameter indicating the specified historical time;
- determine, from a respective data log at the respective memory of the respective logical data block storage device, one or more logical blocks of the respective logical data block storage device containing data satisfying the parameter; and
- configure the workload according to the determined one or more logical blocks.

18. The system of claim 17, wherein each respective logical data block storage device is configured to respond to an error accessing the determined subset of data:
- in response to an error accessing data from at least one of the one or more logical blocks, determine, from the respective data log at the respective memory of the respective logical data block storage device, one or more second logical blocks of the respective logical data block storage device containing data from a next-previous historical time preceding the specified historical time; and
- configure the workload according to the determined one or more second logical blocks.

19. The system of claim 18, wherein each respective logical data block storage device is configured to:
- receive a pause instruction to pause activity for a predefined duration of time; and
- receive the second remote procedure call during the predefined duration of time.

20. The system of claim 19, wherein the predefined duration of time is on the order of milliseconds.

* * * * *